(12) United States Patent
Riederer et al.

(10) Patent No.: US 11,142,140 B2
(45) Date of Patent: Oct. 12, 2021

(54) NOISE INSULATION ELEMENT FOR THE BULKHEAD OF A VEHICLE BODY

(71) Applicant: ADLER PELZER HOLDING GMBH, Hagen (DE)

(72) Inventors: Frank Riederer, Witten (DE); Thomas Karcz, Dortmund (DE); Volkmar Schulze, Schierling (DE); Michael Johler, Balingen (DE); Wolfgang Riedisser, Renningen (DE)

(73) Assignee: Adler Pelzer Holding GMBH, Hagen (DE)

( * ) Notice: Subject to any disclaimer, the term of this patent is extended or adjusted under 35 U.S.C. 154(b) by 126 days.

(21) Appl. No.: 16/500,027

(22) PCT Filed: Apr. 13, 2018

(86) PCT No.: PCT/EP2018/059557
§ 371 (c)(1),
(2) Date: Oct. 1, 2019

(87) PCT Pub. No.: WO2018/192858
PCT Pub. Date: Oct. 25, 2018

(65) Prior Publication Data
US 2020/0031292 A1   Jan. 30, 2020

(30) Foreign Application Priority Data
Apr. 19, 2017 (DE) .......................... 102017108308.1

(51) Int. Cl.
*B60R 13/08* (2006.01)
*B62D 33/06* (2006.01)

(52) U.S. Cl.
CPC ...... *B60R 13/0846* (2013.01); *B60R 13/0815* (2013.01); *B62D 33/0604* (2013.01)

(58) Field of Classification Search
CPC ... B60R 13/08; B60R 13/0815; B60R 13/083; B60R 13/0838; B60R 13/0846
(Continued)

(56) References Cited

U.S. PATENT DOCUMENTS 5,557,078 A   9/1996  Holwerda
5,817,408 A * 10/1998 Orimo .................... B60K 37/00
                                                       428/218
(Continued)

FOREIGN PATENT DOCUMENTS

DE    2526325 A1   12/1976
DE   69716078 T2    6/2003
(Continued)

OTHER PUBLICATIONS

International Search Report for International Application No. PCT/EP2018/059557 dated May 24, 2018.

*Primary Examiner* — Jason S Daniels
(74) *Attorney, Agent, or Firm* — Nexsen Pruet, PLLC; Seth L. Hudson

(57) ABSTRACT

A noise insulation element (14) for the bulkhead (12) of a vehicle body (10) is provided with a mass-spring element (20) which has a plastic support layer (22) as the heavy layer with a front side facing away from the bulkhead (12) when the mass-spring element (20) is installed and with a rear side facing towards the bulkhead (12), and a noise damping layer (24) made from a noise insulating material connected to the rear wall as the spring layer. The support layer (22) is provided on its rear side with an integrally designed hollow fixing projection (16) which is formed on an edge recess with a recess edge which recess is open towards an outer limiting edge section (28) of the support layer (22) and a side wall (30) projecting from the rear side of the support layer (22) and extending along the recess edge.

10 Claims, 5 Drawing Sheets

(58) Field of Classification Search
USPC .............................................. 296/39.1, 39.3
See application file for complete search history.

(56) References Cited

U.S. PATENT DOCUMENTS

| | | | | |
|---|---|---|---|---|
| 6,089,349 A | * | 7/2000 | Aye | ......................... B60R 13/01 |
| | | | | 181/284 |
| 2004/0055813 A1 | * | 3/2004 | Tsuiki | ................. B60R 13/0815 |
| | | | | 181/204 |
| 2005/0046217 A1 | * | 3/2005 | Campbell | ........... B60R 13/0846 |
| | | | | 296/39.3 |
| 2005/0046218 A1 | * | 3/2005 | Campbell | ........... B60R 13/0846 |
| | | | | 296/39.3 |
| 2016/0059797 A1 | * | 3/2016 | Fushiki | ............... B60R 13/0815 |
| | | | | 296/39.3 |

FOREIGN PATENT DOCUMENTS

| | | |
|---|---|---|
| DE | 202004008165 U1 | 9/2005 |
| DE | 202005007646 U1 | 9/2006 |
| DE | 102009006989 B4 | 3/2011 |
| FR | 2935038 A1 | 2/2010 |
| WO | WO-2006119895 A1 * 11/2006 | ........... B60R 13/083 |

\* cited by examiner

NOISE INSULATION ELEMENT FOR THE BULKHEAD OF A VEHICLE BODY

FIELD OF THE INVENTION

The invention relates to a noise insulation element for the bulkhead of a vehicle body (also known as inner dash).

BACKGROUND OF THE INVENTION

It is generally known to arrange a noise insulation element on the inner side of the bulkhead of a vehicle body, i.e. on the inner side of the wall between the passenger compartment and the engine compartment. An example for such a bulkhead insulation is described in DE-B-10 2009 006 989.

Another noise-insulating component to be fastened to the bulkhead of a vehicle body is described in DE-U-20 2004 008 163.

In prior art such noise insulation elements are mounted to vehicle bodies using bolts, screws, clamping discs, clips or the like fastening elements, which has adverse effects with respect to production costs and assembly effort.

Therefore, it is an object of the invention to provide a noise insulation element for the bulkhead of a vehicle body, in which at least at some fixation points no additional fastening elements are required so that the assembly is facilitated.

SUMMARY OF THE INVENTION

To achieve this object, the invention provides a noise insulation element for the bulkhead of a vehicle body, wherein the noise insulation element is provided with a mass-spring element which has a plastic support layer as the so-called heavy or mass layer with a front side facing away from the bulkhead when the mass-spring element is installed and with a rear side facing towards the bulkhead, and a noise damping layer made from a noise absorption material or a noise damping material connected to the rear wall as the so-called spring layer, wherein the support layer is provided on its rear side with a recess and an integrally designed hollow fixing projection, wherein the fixing projection has a bottom wall and a side wall rising from said bottom wall, wherein the side wall extends along the recess of the support layer and has an outer receiving groove for receiving an opening edge of a receiving opening formed in the vehicle body for the fixing projection, wherein the bottom wall of the fixing projection has a bottom wall opening which extends into at least a part of at least two opposite sections of the side wall of the fixing projection, or the bottom wall, in the plane formed thereby, and the side wall of the fixing projection are designed to be compressible in at least two opposite sections, whereby the side wall is designed to be compressible in at least two opposite sections which allows for a movement of the opposite side wall sections towards each other for the purpose of a reduction of the width and/or length dimensions of the fixing projection, so that the fixing projection is insertable into the receiving opening of the vehicle body and the receiving groove of the side wall of the fixing projection engages around the opening edge of the receiving opening of the vehicle body.

According to the invention the noise insulation element has an integrally formed fixing projection. Instead of one such fixing projection, a plurality of such fixing projections may also be provided. It is advantageous if these fixing projections are arranged in those regions of the noise insulation element where the same is fixed to the A column of the vehicle body.

The noise insulation element of the invention is of a multi-layer structure and is, as is known per se, configured as a mass spring element which comprises a plastic support layer as the so-called heavy or mass layer and is provided, in addition, with a noise damping layer (also referred to as a spring layer) of noise-absorbing material.

In the noise insulation element of the invention at least one hollow fixing projection is formed integrally on the rear side of the plastic support layer. This hollow fixing projection is formed by a side wall extending along the edge of a recess of the support layer. The side wall of the fixing element this protrudes from the rear side of the support layer. The side wall has an outer receiving groove on its outer side, which groove engages around the opening edge of the receiving groove when the fixing projection is inserted into a receiving opening of the vehicle body.

The fixing projection or each fixing projection of the mass spring element of the noise insulation element of the invention is then pressed into an associated receiving opening in the vehicle body, wherein the fixing projection straightens up again automatically due to the resilient and elastic plastic support layer when the side wall of the fixing projection is fully inserted into the receiving opening of the vehicle body. The outer receiving groove of the side wall then engages around the opening edge of the receiving opening in the vehicle body and thus fixes the noise insulation element.

According to a variant of the invention the same relates to a noise insulation element for the bulkhead of a vehicle body, wherein the noise insulation element is provided with a mass-spring element which has a plastic support layer as the so-called heavy layer with a front side facing away from the bulkhead when the mass-spring element is installed and with a rear side facing towards the bulkhead, and a noise damping layer made from a noise damping material connected to the rear wall as the so-called spring layer, wherein the support layer is provided on its rear side with an integrally designed hollow fixing projection which is formed on an edge recess with a recess edge which recess is open towards an outer limiting edge section of the support layer, and comprises a side wall extending along the recess edge and projecting from the rear side of the support layer, said side wall comprising an outer receiving groove for receiving an opening edge of a receiving opening formed in the vehicle body for the fixing projection, and a bottom wall which is arranged on the end of the side wall facing away from the edge recess in the support layer, and wherein the bottom wall has a bottom wall opening configured in particular as an oblong hole, which extends from the outer limiting edge section of the support layer into the section of that side wall of the fixing projection that is substantially opposite the outer limiting edge section of the support layer.

In an advantageous embodiment of the invention the side wall may support a bottom wall at its end facing away from the support layer. This bottom wall is integrally connected with the side wall so that the fixing projection may be seen as a bowl of the support layer, as it were. The bottom wall stabilizes the side wall of the fixing projection when the same has straightened up again after having been inserted completely into the receiving opening of the vehicle body. The bottom wall should be compressible, which feasibly also applies for the side wall of the fixing projection. This facilitates the process of the movement of opposite side wall sections towards each other and thus the reduction of the width or length dimensions of the fixing projection when the same is pressed into the receiving opening of the vehicle body.

In another suitable embodiment of the invention it may be provided that the bottom wall of the fixing projection has a bottom wall opening extending into at least two opposite sections of the side wall of the fixing projection, and that the bottom wall opening of the fixing projection defines a line recess delimited by a recess edge, said recess being for the passage of a line, in particular a hydraulic and/or an electric line through the mass spring element, wherein the recess edge of the line recess is provided for contact with the line and thus for maintaining the shape and for stabilizing the bottom wall opening and the line recess thereof. In this embodiment of the invention the fixing projection is used to pass a line therethrough. For this purpose, the fixing projection has a bottom wall with an opening in which, in turn, a line recess is formed which, when a line I passed through the bottom wall opening, gets into contact with the line so that the line stabilizes the bottom such that, in addition, it prevents an inadvertent movement of side wall sections towards each other. In this manner, the fixing of the noise insulation element is more reliable.

In a further advantageous embodiment of the invention it may be provided that the recess edge of the line recess in the bottom wall of the fixing projection is provided with noise damping material as a scoring protector and, in particular, s embedded in noise damping material.

In a further advantageous embodiment of the invention it may be provided that the noise damping layer extends into the outer receiving groove of the side wall. This provides for a further improved fixing of the fixing projection in the receiving opening of the vehicle body.

In a further suitable embodiment of the invention it may be provided that the bottom wall of the fixing projection has a bottom wall opening which extends into at least two opposite sections of the side wall of the fixing projection, and that the bottom wall opening is designed as an oblong hole, in particular as a slot or gap. Due to the bottom wall being provided with a bottom wall opening, the width and length dimensions of the fixing projection can be reduced in a simple manner, respectively, which is advantageous for the insertion of the fixing projection into the receiving opening of the body vehicle. An otherwise compressible bottom wall may for example comprise strip- or line-shaped thinning regions extending beyond the bottom wall into the side walls, which regions allow the bottom wall to be compressed or folded, respectively.

In a further suitable embodiment of the invention it may be provided that the one flank of the outer receiving groove of the side wall of the fixing projection is formed by the section of the rear side of the support layer adjoining the recess of the support layer and/or by noise damping material possibly existing there, that the outer receiving groove has a groove base formed by a first region of the side wall rising from the rear side of the support layer, and that the other flank of the outer receiving groove opposite said one flank is formed by an outward extending section of the side wall, wherein this section of the side wall is adjoined by a further section of the side wall projecting from the former section and facing away from the rear side of the support layer, said further section transitioning into the bottom wall of the fixing protrusion.

As is obvious from the above, the side wall of the fixing projection (seen in cross section) is advantageously of an S-shaped design to form the outer receiving groove.

In a further suitable embodiment of the invention it is provided that the bottom wall of the fixing projection has a bottom wall opening which extends into at least three mutually offset sections of the side wall and in particular into four sections of the side wall of the fixing projection offset by 90° with respect to each other.

The above description of the invention includes fixing projections whose side walls extend all around the recess in the support layer. Such a fixing projection should eventually be compressible along two mutually orthogonal directions, so that it can be pressed effortlessly into the receiving opening of the vehicle body.

However, it may be advantageous to provide the fixing projection adjoining to the outer limiting edge section of the support layer. In this case, the recess in the support layer is configured as an edge recess which is open to the outer limiting edge section of the support layer. In an advantageous embodiment of the invention it is thus provided that the recess of the support layer of the spring mass element is designed as an edge recess open to an outer limiting edge section of the support layer and having a recess edge, wherein the side wall rising from the rear side of the support layer ends at the outer limiting edge section of the support layer. The side wall of the fixing projection thus ends at the outer limiting edge section, respectively, so that its path along the circumference of the fixing projection is substantially U- or C-shaped. Th the free end of the side wall, where the same adjoins the outer limiting edge section, the fixing projection can now be compressed in a simple manner for insertion into the receiving opening of the vehicle body.

In a further suitable embodiment of the invention it may further be provided that the bottom wall of the fixing projection has a bottom wall opening designed in particular as a slot, a gap, or more generally speaking, an oblong hole extending from the outer limiting edge section of the support layer into at least a part of the section of the sidewall of the fixing projection which is substantially opposite the support layer.

Finally, it is advantageously provided in a further embodiment of the invention that the side wall of the fixing projection has a cutout (a recess) in its section substantially opposite the outer limiting edge section of the support layer.

BRIEF DESCRIPTION OF THE DRAWINGS

The invention will be described in more detail hereinafter with reference to two embodiments and with reference to the drawings. Specifically, the Figures show.

DETAILED DESCRIPTION OF THE INVENTION

Figure 1:
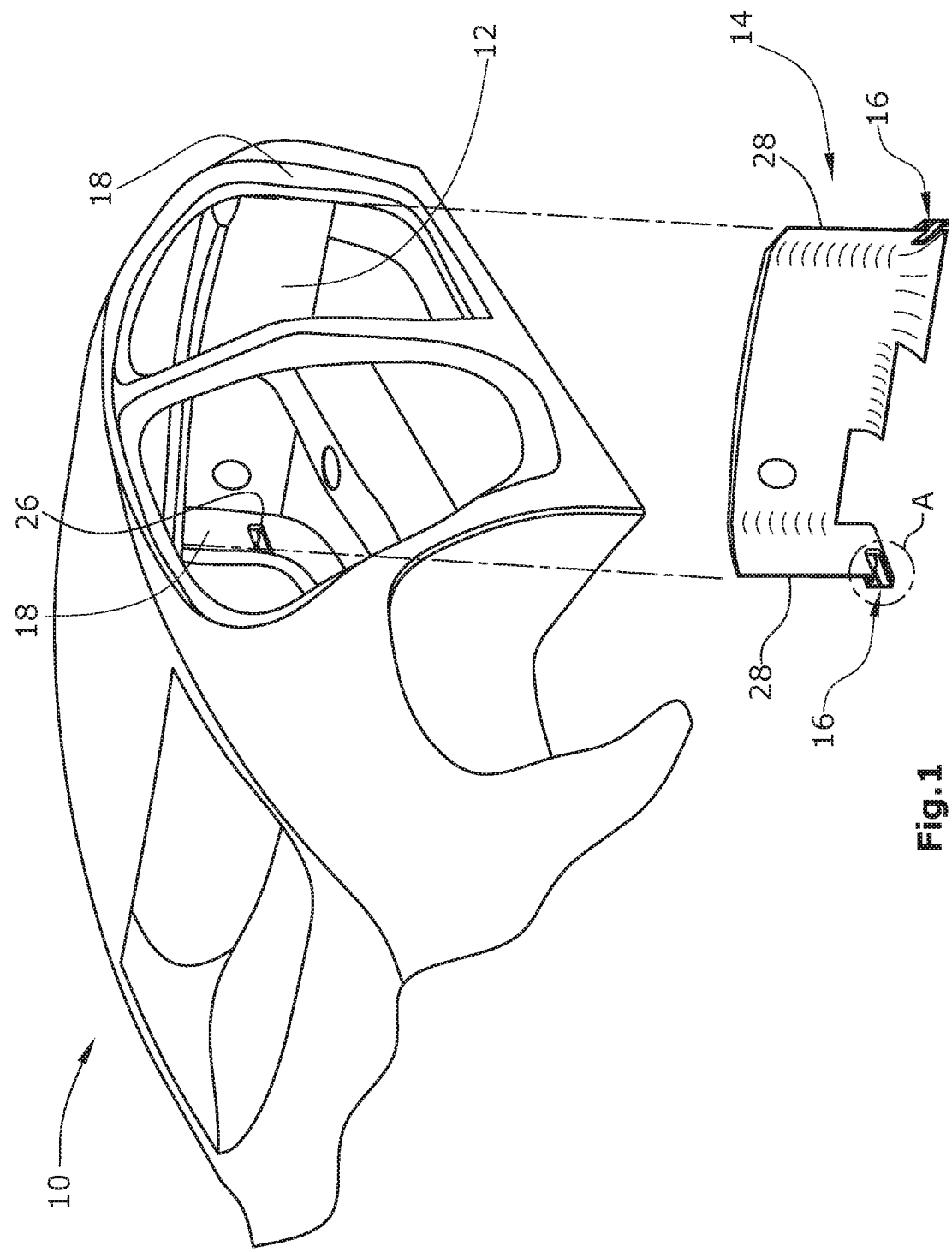
FIG. 1 is a perspective and exploded view of a vehicle body with a bulkhead noise insulation element.
Figure 2:
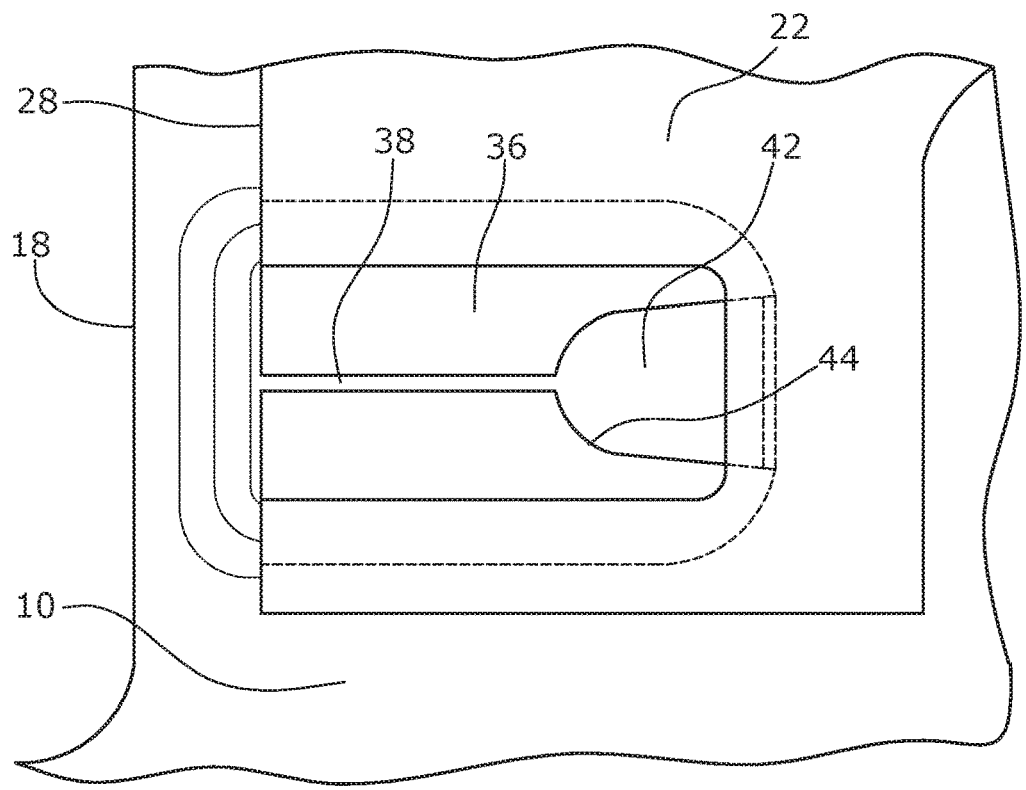
FIG. 2 is a front view of the noise insulation element of FIG. 1 in the region of one of its fixing projections (see region A in FIG. 1)
Figure 3:
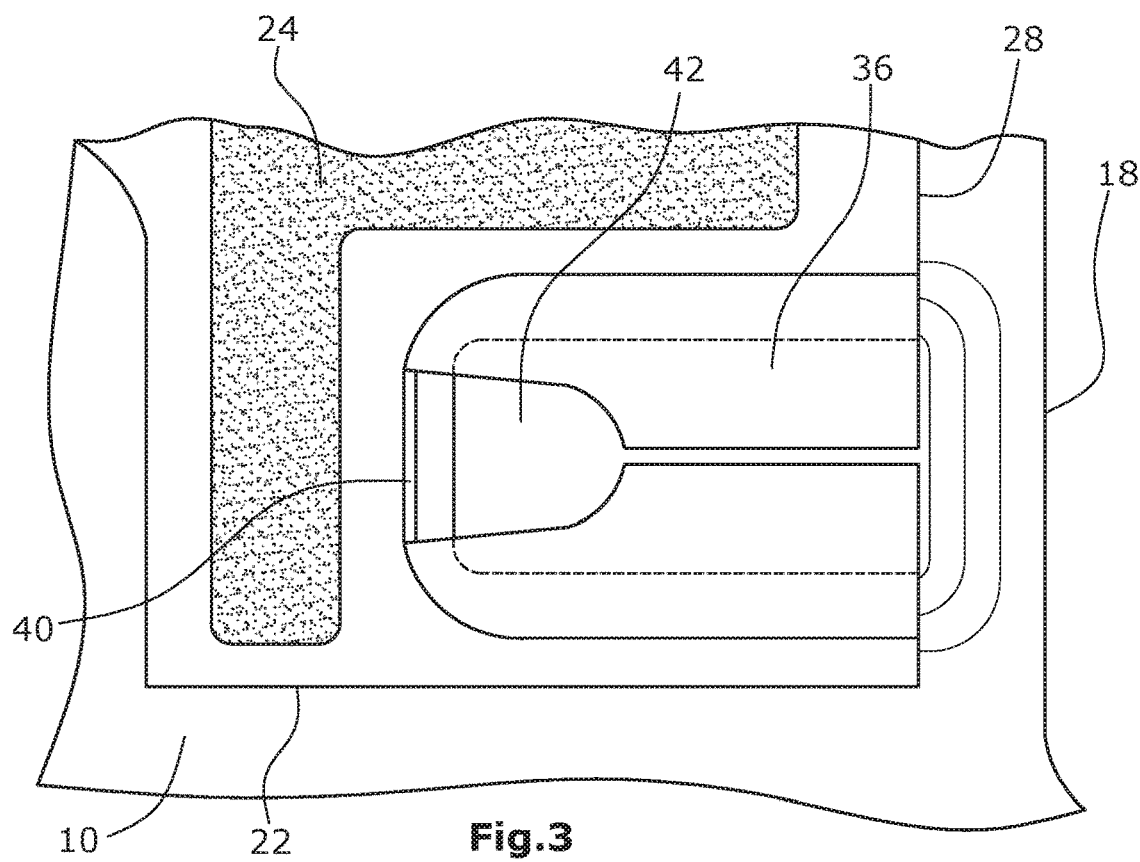
FIG. 3 is a rear view of the noise insulation element of FIG. 1 in the region of one of its fixing projections (see region A in FIG. 1)

FIG. 1 is a schematic illustration of a vehicle body 10 with a bulkhead 12 on which a noise insulation element 14 is arranged. The noise insulation element 14 is fixed to the bulkhead 12 at least in part by means of fixing projections 16, which may be hollow, integrally formed with the noise insulation element 14, which projections 16, when the noise insulation element 14 is in the mounted state, each cooperate with a respective receiving opening 26 in the vehicle body 10 in which the fixing projections 16 are positioned. In this embodiment the receiving openings 26 of the vehicle body 10 are formed in the region of the A-columns 18.

Figure 5:
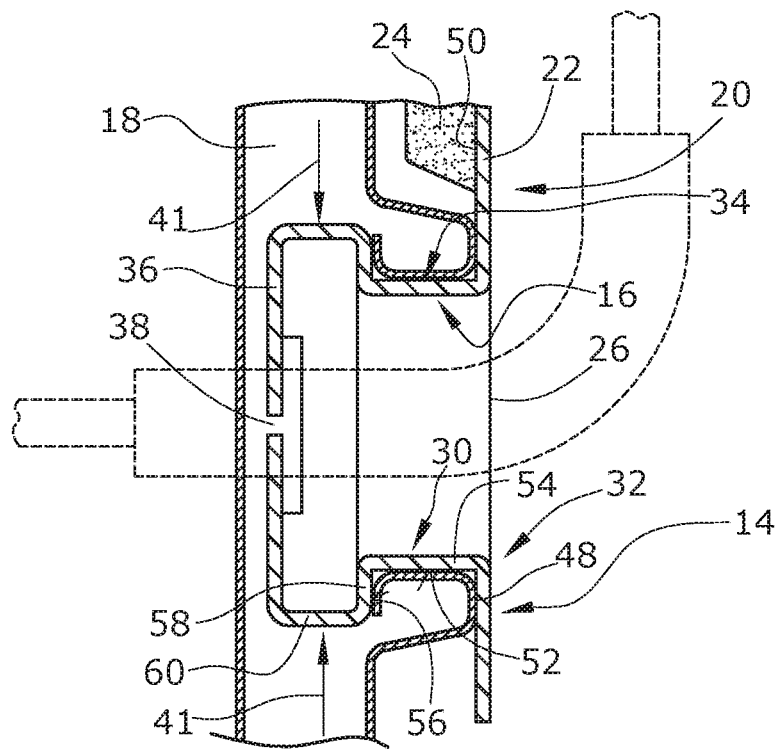
FIG. 5 is a sectional view along line V-V in FIG. 4.
Figure 6:
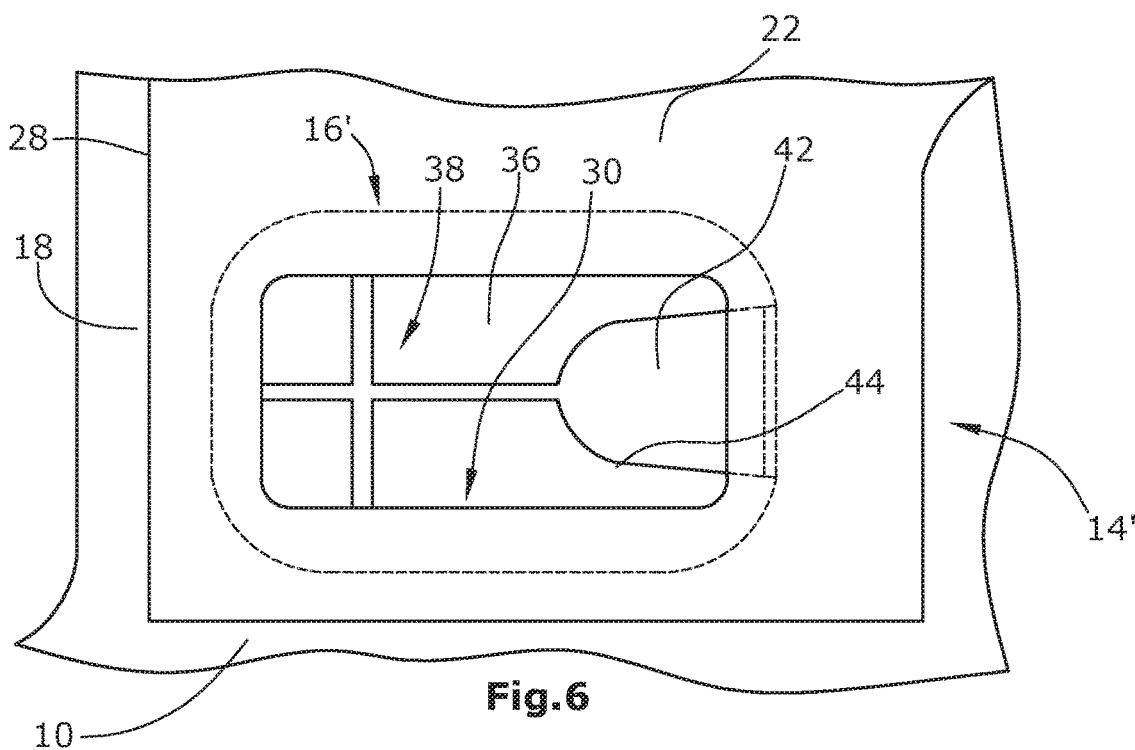
FIG. 6 is a front view of the noise insulation element with a fixing projection extending all around a recess.
Figure 7:
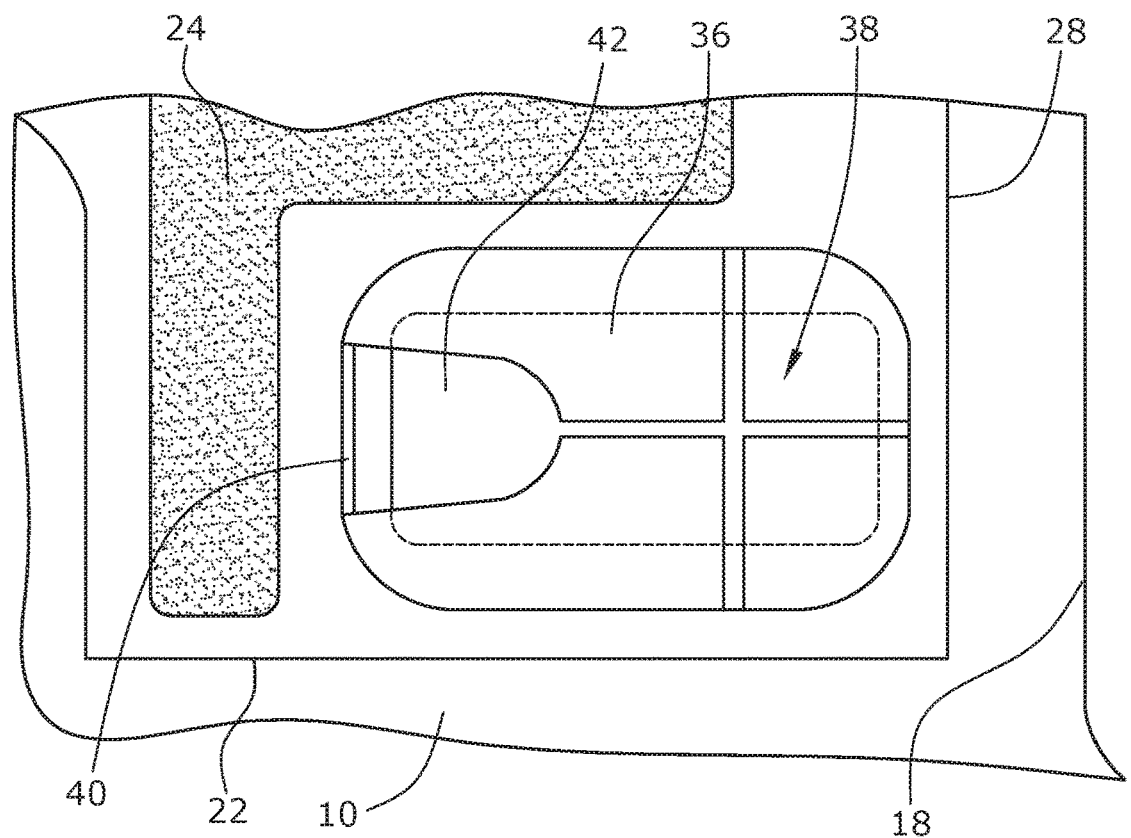
FIG. 7 is a rear view of the noise insulation element with a fixing projection extending all around a recess.
Figure 8:
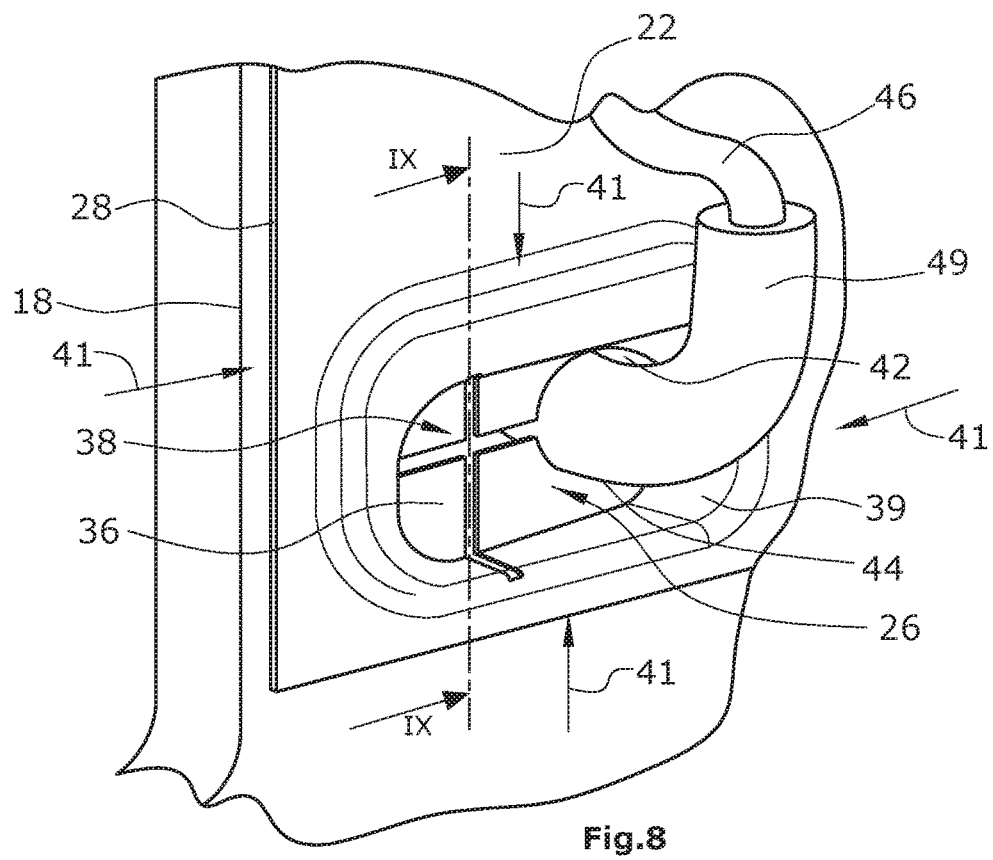
FIG. 8 is a perspective view of the noise insulation element mounted on the vehicle body, in the region of the fixing projection, for the clarification of the interaction between the fixing projection and the vehicle body for the purpose of fixing the noise insulation element.
Figure 9:
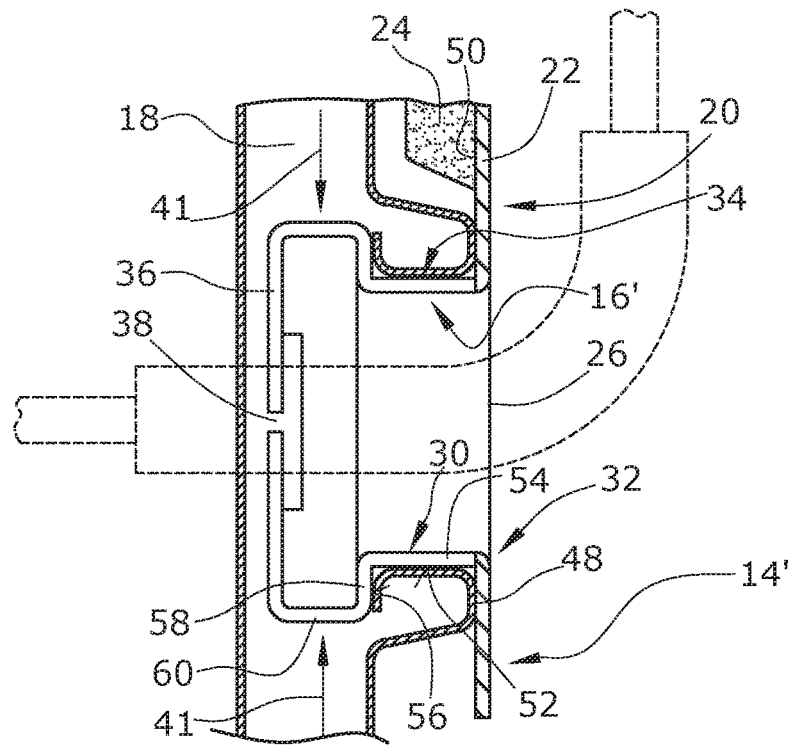
FIG. 9 is a sectional view along line IX-IX in FIG. 8.

As is visible e.g. in FIG. 5, the noise insulation element 14 has a mass spring (plate) element 20 comprising a plastic support layer 22 as the heavy or mass layer of e.g. EVA/PE, PE, PP, EPDM, TPE TPO and/or polyurethane foam, each with a high percentage by weight of up to 70% of a mineral filler of high density, e.g. feldspar, and having a noise damping layer 24 of a noise damping material (e.g. PU foam).

Figure 4:
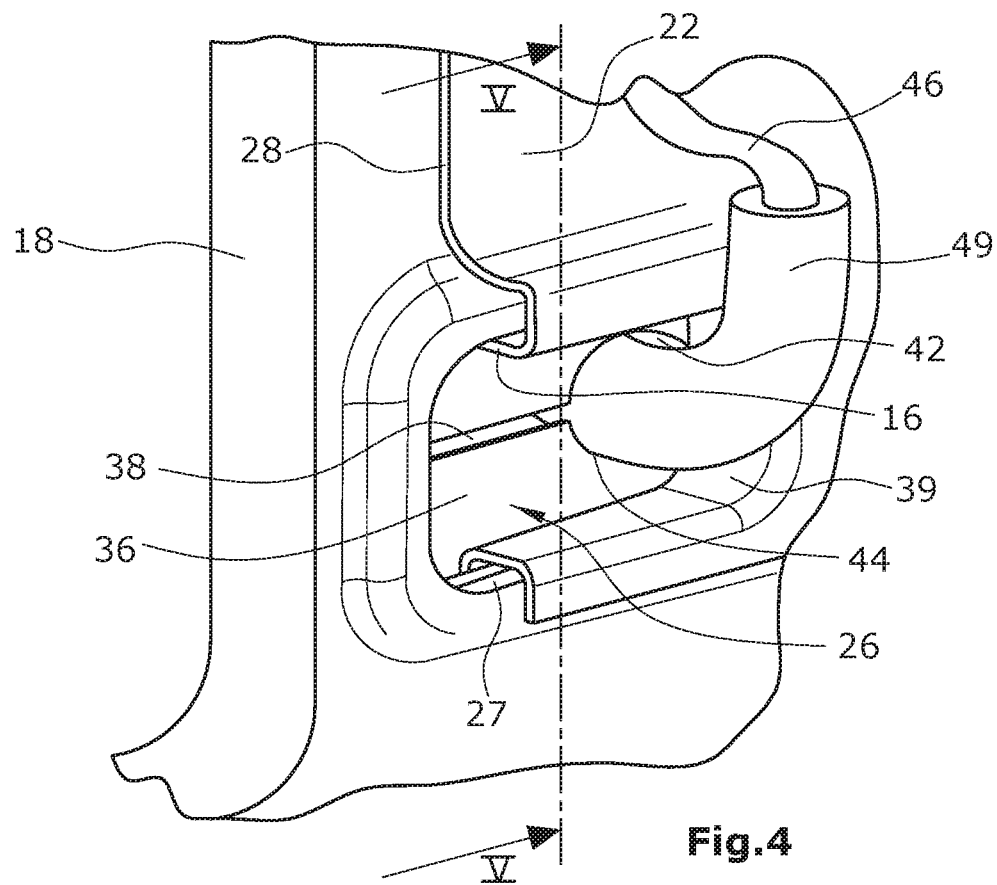
FIG. 4 is a perspective view of the noise insulation element mounted on the vehicle body, in the region of the fixing projection, for the clarification of the interaction between the fixing projection and the vehicle body for the purpose of fixing the noise insulation element.

As shown in FIG. 4, a recess 27 is formed in the plastic support layer 22, an integrally formed fixing projection 16 extends around the recess 27. The recess 27 and the fixing projection 16 respectively extend to the outer limiting edge section 28 of the mass spring element 20. The fixing projection 16 has a side wall 30 extending along the opening edge 32 of the recess 27. Contiguous with the opening edge 32 of the recess 27, the side wall 30 has an outer receiving groove 34. Overall, the side wall 30 is S-shaped when seen in section as in FIG. 5.

In this embodiment the end of the fixing projection 16 averted from the recess 27 of the plastic support layer 22 is formed by a bottom wall 36 having a gap- or slot-shaped bottom wall opening 38. This opening 38 extends into two opposite regions 39 of the side wall 30 and provides for the compressibility of the fixing projection 16 in the direction of the arrows 41 in FIG. 5. In the region 39 facing away from the outer limiting edge section 28 the side wall 30 has a cutout 40. Thereby, the fixing projection 16 can be inserted into the receiving opening 26 of the vehicle body 10. In the inserted state at least a partial section of the opening edge 32 of the receiving opening 26 is inserted into the outer receiving groove 34 of the side wall 30 of the fixing projection 16.

As is further evident from FIGS. 2 to 5, the bottom wall opening 38 has a line recess 42 defined by a recess edge 44. In this enlarged region of the bottom wall opening 38, a line 46, e.g. a hydraulic line or an electric line, can be passed through the fixing projection 16. The line 46 may have an outer jacket 49 of e.g. foamed plastic material that serves as a scoring protector. As an alternative, for example foam may be applied around the edge of the bottom wall opening 38 to thereby provide a scoring protector for the line 46.

After the assembly of the noise insulation element 14 to the vehicle body 10, a line 46 can thus be passed through the fixing projection 16. The line 46 stabilizes the bottom wall 36 by the fact that the recess edge 44 of the line recess 42 of the bottom wall opening 38 abuts on the outside of the line 46 or on the scoring protector (outer jacket 49) of the line 46 or by the fact that a scoring protector formed at the recess edge 44 abuts on the line 46. In this manner the line 46 or the scoring protector keeps the line recess 42 "open" and thus indirectly keeps the fixing projection 16 "spread" as illustrated in FIG. 5.

As can be seen with reference to FIGS. 2 to 5, one flank 48 of the outer receiving groove 34 is formed by the section of the rear side 50 of the support layer 22, which adjoins the recess 27 in the support layer 22, or, if applicable, by noise damping material present there. The outer receiving groove 34 has a groove base 52 formed by a first region 54 of the side wall 30 rising from the rear side 50 of the support layer 22. Opposite the above-mentioned flank 56 a second flank 56 of the outer receiving groove 34 is located which is formed by a section 58 of the side wall 30 extending outward. This section 58 is adjoined by a further section 60 of the side wall 30 that transitions into the bottom wall 36 of the fixing projection 16.

The recess 27 according to FIGS. 2 to 5 is designed as an edge recess open to the outer limiting edge section 28.

FIGS. 6 to 9 illustrate an embodiment of a fixing projection 16' of a noise insulation element 14', wherein the side wall 30 extends all around the recess 27 of the support layer 22. In as far as the elements of the fixing projection 16', which may be hollow, are identical with the elements of the fixing projection 16 of FIGS. 2 to 4 or correspond thereto, they are identified throughout FIGS. 6 to 9 by the same reference numerals as in FIGS. 2 to 5.

For the fixing projection 16' to be insertable into a receiving opening 26 of the vehicle body 10 in a comparatively simple manner, the bottom wall opening 38 preferably has a cross-slot or cross-gap structure. The bottom wall opening 38 again extends into respectively opposite sections of the side wall 30, so that the fixing projection 16' is now compressible in two directions orthogonal to each other (see arrows 41 in FIG. 8). In the embodiment in FIGS. 2 to 5, such an interruption of the side wall at a plurality of opposite points is not necessary, since, there, the fixing projection 16 is open to the outer limiting edge section 28.

LIST OF REFERENCE NUMERALS 10 vehicle body
12 bulkhead
14 noise insulation element
14' noise insulation element
16 fixing projection
16' fixing projection
18 A column
20 mass spring (plate) element
22 plastic support layer of the mass spring element
24 noise damping layer of the mass spring element
26 receiving opening of the vehicle body
27 recess in the mass spring element
28 outer limiting edge section
30 side wall of the fixing projection 32 opening edge of the recess
34 outer receiving groove of the fixing projection
36 bottom wall of the fixing projection
38 bottom wall opening in the bottom wall
39 opposite regions of the fixing projection
40 cutout in the side wall
41 arrows
42 line recess
44 recess edge of the bottom wall opening
46 line
48 flank of the outer receiving groove
49 outer jacket
50 rear side of the mass spring element
52 groove base of the outer receiving groove
54 first region of the side wall
56 flank of the outer receiving groove
58 outward extending section of the side wall
60 further section of the side wall

The invention claimed is:

1. A noise insulation element for a bulkhead of a vehicle body, comprising:
    a mass-spring element which has a plastic support layer with a front side facing away from the bulkhead and with a rear side facing towards the bulkhead, and a noise damping layer made from a noise absorption material connected to a rear wall,
    wherein the plastic support layer is provided on its rear side with a recess and an integrally designed hollow fixing projection,
    wherein the fixing projection has a bottom wall and a side wall rising from said bottom wall,
    wherein the side wall of the fixing projection extends along the recess of the plastic support layer and has an outer receiving groove for receiving an opening edge of a receiving opening formed in the vehicle body for the fixing projection,
    wherein
        the bottom wall of the fixing projection has a bottom wall opening which extends into at least a part of at least two opposite sections of the side wall of the fixing projection,
    or
        the bottom wall, in the plane formed thereby, and the side wall of the fixing projection are designed to be compressible in at least two opposite sections, and
    wherein the bottom wall of the fixing projection has a bottom wall opening extending into at least two opposite sections of the side wall of the fixing projection, and that the bottom wall opening of the fixing projection defines a line recess delimited by a recess edge for the passage of a line, wherein the recess edge of the line recess is provided for contact with the line and thus for maintaining the shape and for stabilizing the bottom wall opening and the line recess thereof.

2. The noise insulation element of claim 1, wherein the recess edge of the line recess in the bottom wall of the fixing projection is provided with noise damping material as a scoring protector for the line and is embedded in noise damping material.

3. The noise insulation element of claim 1, characterized in that the bottom wall of the fixing projection has a bottom wall opening extending into at least two opposite sections of the side wall of the fixing projection, and that the bottom wall opening is designed as an oblong hole.

4. The noise insulation element of claim 1, characterized in that the side wall of the fixing projection is S-shaped for forming the outer receiving groove.

5. The noise insulation element of claim 4, further comprising:
    a first flank of the outer receiving groove of the side wall of the fixing projection is formed by the section of the rear side of the support layer adjoining the recess of the support layer and/or by noise damping material,
    wherein the outer receiving groove has a groove base formed by a first region of the side wall rising from the rear side of the support layer, and
    a second flank of the outer receiving groove opposite said first flank is formed by an outward extending section of the side wall,
    wherein the outward extending section of the side wall is adjoined by a further section of the side wall projecting from the outward extending section of the side wall and facing away from the rear side of the support layer, said further section transitioning into the bottom wall of the fixing protrusion.

6. The noise insulation element of claim 1, wherein the bottom wall of the fixing projection has a bottom wall opening which extends into at least three mutually offset sections of the side wall.

7. The noise insulation element of claim 6, wherein the bottom wall opening extends into four sections of the side wall of the fixing projection offset by 90° with respect to each other.

8. The noise insulation element of claim 1, wherein the recess of the support layer of the spring mass element is designed as an edge recess with a recess edge, the edge recess being open to an outer limiting edge section of the support layer, the side wall rising from the rear side of the support layer ending at the outer limiting edge section of the support layer.

9. The noise insulation element of claim 8, wherein the bottom wall of the fixing projection has a bottom wall opening extending from the outer limiting edge section of the support layer into at least a part of the section of the side wall of the fixing projection substantially opposite the outer limiting section of the support layer.

10. The noise insulation element of claim 8, wherein the side wall of the fixing projection has a cutout in the section substantially opposite the outer limiting edge section of the support layer.

* * * * *